United States Patent [19]

Jinnai

[11] 4,328,505

[45] May 4, 1982

[54] INK JET PRINTING APPARATUS

[75] Inventor: Koichiro Jinnai, Tokyo, Japan

[73] Assignee: Ricoh Company, Ltd., Tokyo, Japan

[21] Appl. No.: 181,608

[22] Filed: Aug. 27, 1980

[30] Foreign Application Priority Data

Sep. 3, 1979 [JP] Japan ................................ 54-111727

[51] Int. Cl.[3] ............................................ G01D 18/00

[52] U.S. Cl. ............................................ 346/75

[58] Field of Search ............................................ 346/75

[56] References Cited

U.S. PATENT DOCUMENTS 3,999,188 12/1976 Yamada ................................ 346/75

4,012,745 3/1977 Brown et al. ..................... 346/75 X 4,080,606 3/1978 Yamada ................................ 346/75

*Primary Examiner*—John Gonzales

*Attorney, Agent, or Firm*—David G. Alexander

[57] ABSTRACT

An alternating drive signal is applied to an ink ejection head (11) to cause a jet of ink to be ejected which separates into droplets at a certain position. A charging electrode (16) is provided at this position to charge the droplets where it is desired to print a dot. Charged droplets are deflected by deflection electrodes (18), (19) to hit a sheet of paper (32) for printing whereas uncharged drops hit a gutter (21). The sheet (32) is moved relative to the ejection head (11) for scanning. The phases of the drive signal and an alternating charging signal applied to the charging electrode (16) are continuously varied between limit values. The phase of the charging signal is locked when the sheet (32) reaches a prescan position. The phase of the drive signal is locked when a charged condition of the droplets is detected. This ensures that adjacent scan lines will not be displaced from each other in the scan direction.

4 Claims, 4 Drawing Figures

INK JET PRINTING APPARATUS

BACKGROUND OF THE INVENTION

The present invention relates to an improved ink jet printing apparatus which eliminates a cause of distorted images.

In such an apparatus, a sheet of paper is moved relative to an ink ejection head. A typical arrangement is to wrap the sheet around a drum and rotate the drum for scanning. Each time a scan line is printed, the ejection head is moved parallel to the axis of the drum by one increment to print the next scan line. An alternating drive signal is applied to the ejection head to cause a jet of ink to be ejected therefrom which separates into droplets at a certain position. An alternating charging signal is applied to a charging electrode disposed at said position to charge the droplets where it is desired to print a dot on the sheet. The charged droplets are deflected by deflecting electrodes onto the sheet. Where it is not desired to print a dot, the charging signal is not applied and the droplets are not deflected and hit a gutter.

It is known to intially vary the phase of the drive signal relative to the charging signal until it is detected that the droplets are charged. However, due to fluctuations in the rotational speed of the drum and the like it has occurred in the prior art that adjacent scan lines are displaced from each other in the scan direction, producing a distorted image. Although it is theoretically possible to reduce this problem to a negligible level by increasing the frequency of the drive and charging pulses, it is not possible in actual practice due to the limited operating speed of the apparatus.

SUMMARY OF THE INVENTION

An ink jet printing apparatus including an ink ejection head, drive signal generator means for applying an alternating electric drive signal to the ejection head causing the ejection head to eject a jet of ink which separates into droplets at a predetermined position, charging electrode means disposed at the predetermined position, charging signal generator means for applying an alternating electric charging signal to the charging electrode means for charging the droplets, charge detector means disposed downstream of the charging electrode means for detecting a charged condition of the ink droplets and scan means for producing relative scanning movement between the ejection head and a sheet, and is characterized by comprising position detector means for detecting a prescan position of the ejection head relative to the sheet, and control means for initially causing the drive signal generator means and the charging signal generator means to sweepingly vary phases of the drive signal and charging signal between predetermined respective limit values, lock the phase of the charging signal at a present value when the position detector means detects the prescan position and subsequently lock the phase of the drive signal when the charge detector means detects the charged condition of the droplets.

In accordance with the present invention, an alternating drive signal is applied to an ink ejection head to cause a jet of ink to be ejected which separates into droplets at a certain position. A charging electrode is provided at this position to charge the droplets where it is desired to print a dot. Charged droplets are deflected by deflection electrodes to hit a sheet of paper for printing whereas uncharged drops hit a gutter. The sheet is moved relative to the ejection head for scanning. The phases of drive signal and an alternating charging signal applied to the charging electrode are continuously varied between limit values. The phase of the charging signal is locked when the sheet reaches a prescan position. The phase of the drive signal is locked when a charged condition of the droplets is detected. This ensures that adjacent scan lines will not be displaced from each other in the scan direction.

It is an object of the present invention to provide an ink jet printing apparatus which prints in such a manner that all scan lines are aligned with each other in the scan direction.

It is another object of the present invention to provide an ink jet printing apparatus which produces undistorted images.

It is another object of the present invention to provide a generally improved ink jet printing apparatus.

Other objects, together with the foregoing, are attained in the embodiments described in the following description and illustrated in the accompanying drawing.

DESCRIPTION OF THE PREFERRED EMBODIMENTS

While the ink jet printing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
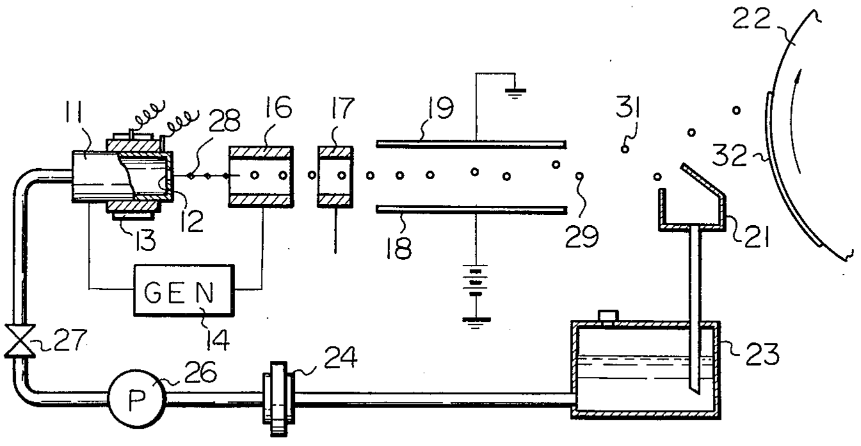
FIG. 1 is a schematic diagram of an ink jet printing apparatus embodying the present invention; p

FIG. 1 schematically shows the overall construction of an exemplary ink jet printing apparatus to which the present invention is applicable. The ink jet printer has an ink ejection or jet head 11, an orifice (nozzle) 12, an electrostrictive vibrator 13, a print signal generator 14, a charging electrode 16, a charge detecting electrode 17, deflecting electrodes 18 and 19, a gutter 21 for collecting unused ink droplets, a rotary drum 22, an ink tank 23, a filter 24, an ink supply pump 26 and a pressure regulator valve 27. The electrostrictive vibrator 13 vibrates ink in the ink jet head 11 and causes it to be ejected from the head 11 through the orifice 12. The resultant column or jet of ink 28 separates at the charging electrode 16 into droplets and is selectively charged from the print signal generator 14 in accordance with the print data signal. Non-charged ink droplets 29 are collected in the gutter 21 while charged droplets 31 are deflected by the electrodes 18 and 19 in proportion to the amount of charge and impinge on a recording sheet 32 on the drum 22 to print data.

With this ink jet printer, the ink jet head 11 moves perpendicular to the rotating direction of the drum 22 and a line scan or printing operation begins in response to a prescan or synchronization signal which is generated for every rotation of the drum 22. However, it is difficult in practice to fully synchronize the rotation of the drum 22 with the drive frequency, resulting in distortion as discussed above.

Figure 2:
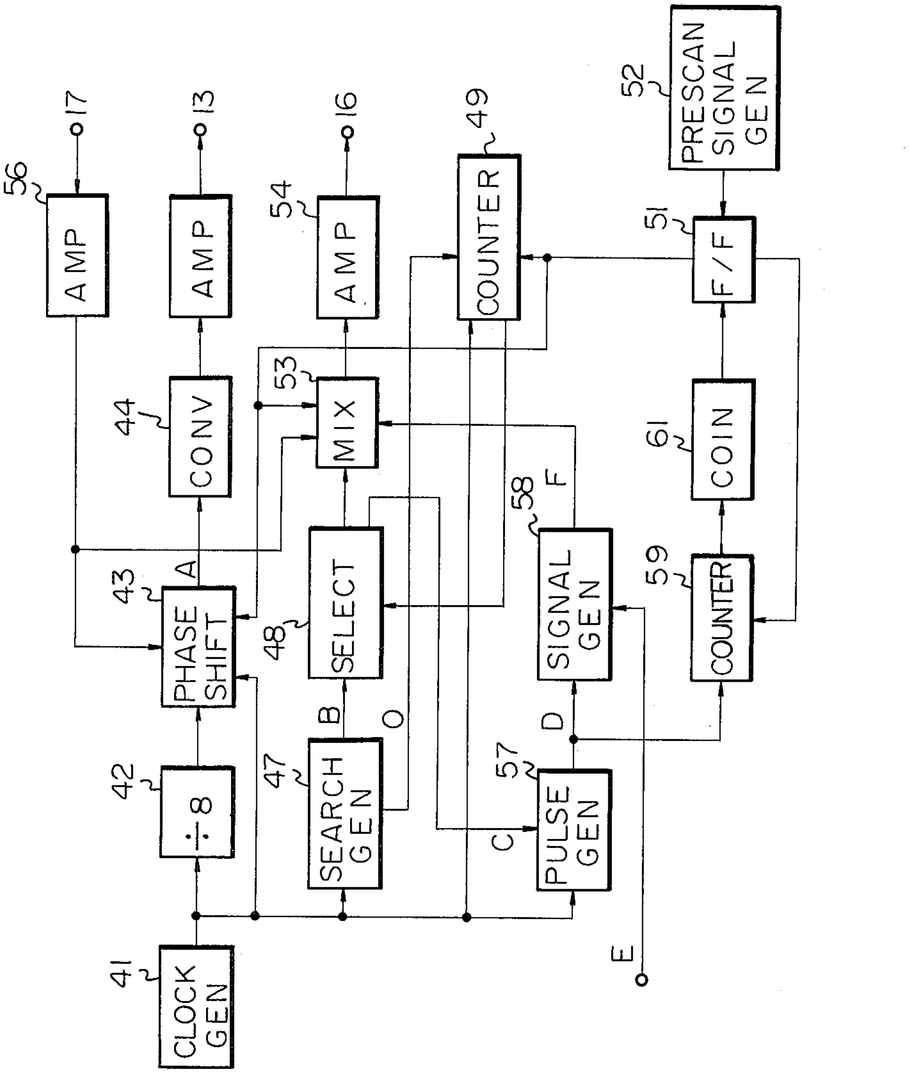
FIG. 2 is a block diagram of the apparatus.
Figure 3:
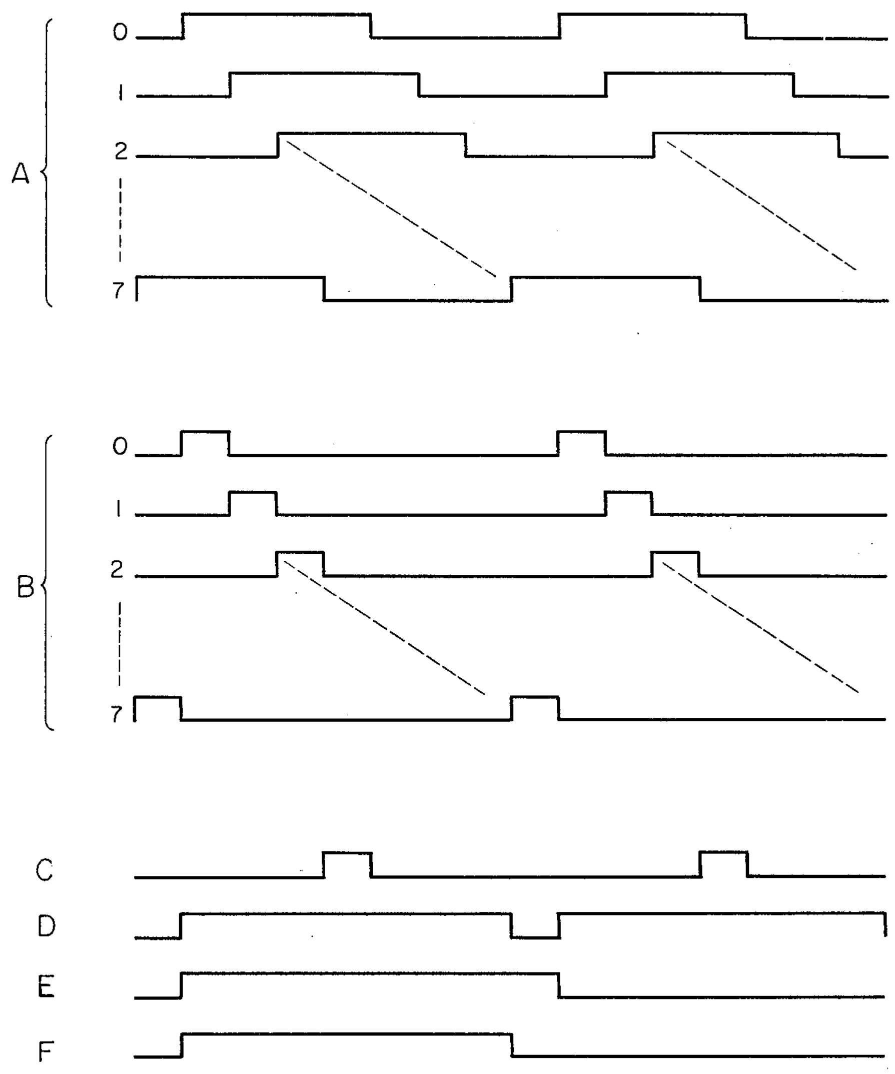
FIG. 3 is a timing diagram of the apparatus.

Referring to FIG. 2, there is shown in block diagram form a compensation system according to the present invention. The system includes a clock pulse generator 41 adapted to generate clock pulses at a frequency which may be eight times the frequency for driving the electrostrictive vibrator 13. Output pulses of the clock pulse generator 41 are divided by $\frac{1}{8}$ by a frequency divider 42 and therefrom fed to a phase shift circuit 43. The clock pulses from the generator 41 are also supplied directly to the phase shift circuit 43 to progressively delay the input signal to the phase shift circuit 43 by one phase intervals. Accordingly, the phase shift circuit 43 produces eight different alternating drive signals A (see FIG. 3).

One of these drive signals A is processed by a pulse-to-sinusoidal wave converter 44 into a sinusoidal wave which is then amplifiered by an amplifier 46 and supplied to the vibrator 13. Meanwhile, a pulse train generator 47 supplies a selector 48 successively with search signals each having a duration corresponding to the period of one clock pulse. The search pulse of phase "0" is fed to an 8-bit counter 49 for resetting the same. The 8-bit counter 49 counts input clock pulses from the clock pulse generator 41 and its count corresponds to the phases "0"-"7" of the pulses B. The counter 49 keeps on counting the clock pulses until the prescan signal indicative of one rotation of the drum 22 is generated by a generator 52. The prescan signal sets a set-reset flip-flop 51 so that the counter 49 stops counting the clock pulses and the phase search is initiated. The count of the counter 49 is supplied to the selector 48. Supposing that the prescan signal has appeared at phase "3", the selector 48 selects a search pulse of phase "3" and passes it to the charging electrode 16 through a mixer 53 and an amplifier 54. If the detecting electrode 17 does not generate a signal within, say, 1 ms after generation of the search pulse, the phase shift circuit 43 shifts the phase of the drive signal. This procedure will be repeated until the detecting electrode 17 delivers a signal. At the instant an output signal of the detecting electrode 17 indicating the appearance of charged ink droplets has been generated, the signal is coupled through an amplifier 56 to the phase shift circuit 43. Then the operation of the phase shift circuit 43 is interrupted and the search pulse (phase "3") at this instant is supplied as an optimum phase pulse C to a charging pulse generator 57. This generator 57 generates charging pulses D having a period whose center is the optimum phase pulse C and supplies them to a charging signal generator 58 and a counter 59 at the same time. The charging signal generator 58 generates an alternating charging signal F from a print data signal E and the charging pulses D by means of an AND gate (not shown). If a Print data signal E is present, the circuit 58 passes the charigng signal F to the charging electrode 16 through the mixer 53 and amplifier 54.

Ink droplets charged by the charging electrode 16 are deflected by the deflecting electrodes 18 and 19 for printing a dot. At the time the printing operation begins, the counter 59 starts counting the charging pulses fed thereto from the charging pulse generator 53. When the count of the counter 53 reaches a predetermined number, a coincidence circuit 61 supplies the flip-flop circuit 51 with a coincidence signal to reset the same. This is the end of one scan line of printing operation. Upon resetting of the flip-flop 51, the 8-bit counter 49 is activated and counts the input pulses until another prescan signal appears. When the flip-flop 51 is set, the counter 49 stops counting and the search is carried out with the particular phase indicated by the count of the counter 49. This will be followed by the printing operation for the next line.

Though the present invention has been shown and described in connection with an ink jet printer of the rotary scan type, it is similarly applicable to a linear scan type ink jet printer. The phase of the drive signal which has been divided by eight in this embodiment may be subjected to any other ratio of frequency division. It will be apparent that, for example, twelve phases additionally reduce the dislocation of dots compared with eight phases. While a charge detecting electrode has been employed to detect the charging timing of ink droplets, the detecting electrode may be replaced by pressure sensing means, a photosensor or the like located in the deflecting position.

A system according to the present invention permits the movement of a recording sheet and ejection of ink droplets to become synchronous with each other by controlling the phase of a drive signal and, thus, minimizes dislocation of ink dots on the recording sheet without resort to any increase in the drive frequency.

Figure 4:
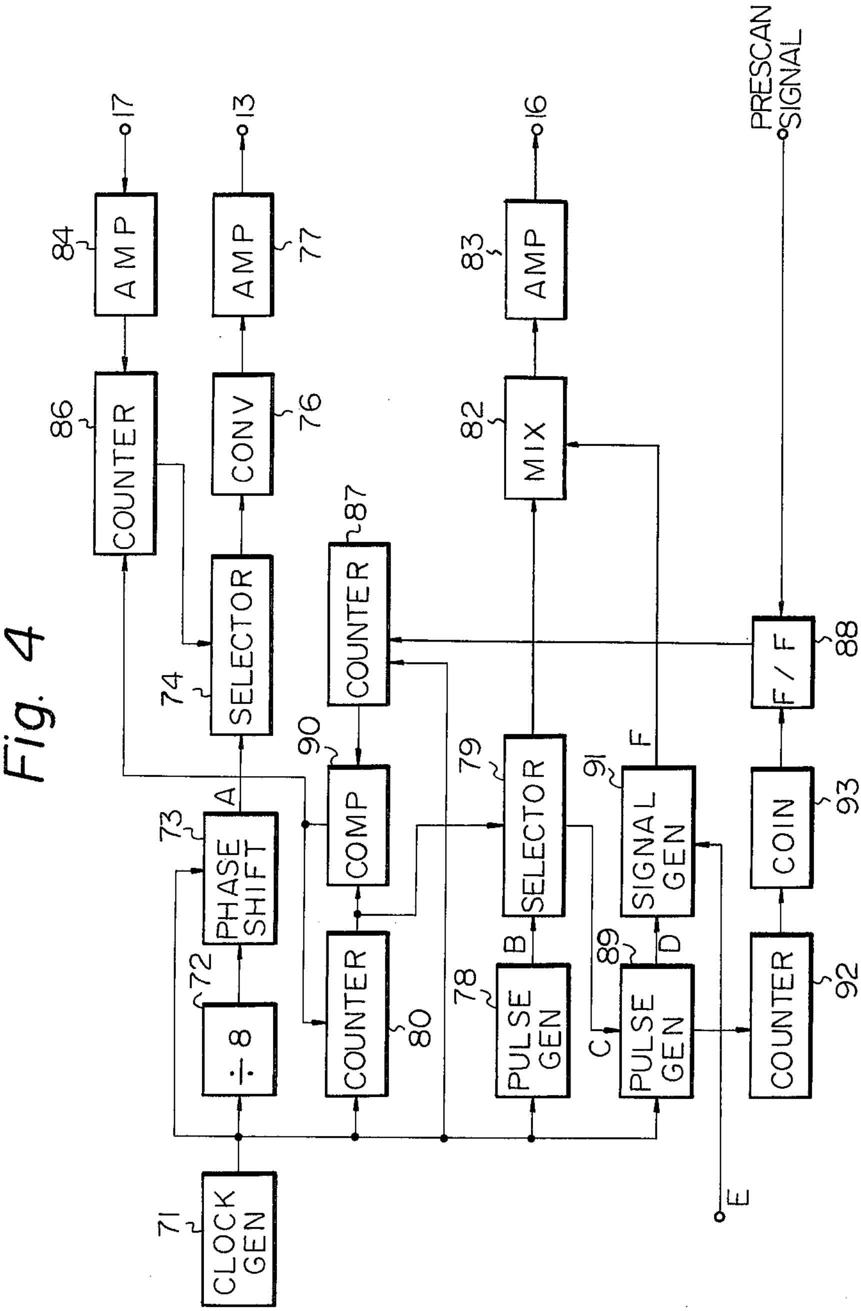
FIG. 4 is a block diagram of another embodiment of the apparatus.

Another embodiment of the present invention is shown in FIG. 4. The system includes a clock pulse generator 71 adapted to generate clock pulses at a frequency which may be eight times the frequency for driving the electrostrictive vibrator 13. The output pulses of the clock pulse generator 71 are divided by $\frac{1}{8}$ by a frequency divider 72 and fed therefrom to a phase shift circuit 73. The clock pulses from the generator 71 are also supplied directly to the phase shift circuit 73 to delay the input signal of the phase shift circuit 73 by one phase increments. Accordingly, the phase shift circuit 73 produces the eight different drive signals A. One of these drive signals A is selected by a selector 74, converted into a sinusoidal wave by a pulse-to-sinusoidal wave converter 76, amplified by an amplifier 77 and supplied to the vibrator 13 therefrom. Meanwhile, a pulse train generator 78 supplies a selector 79 successively with search signals B each having a period corresponding to one clock pulses. The selector 79 selects an optimum search phase C. Before printing, the system searches for the optimum phase. First, a counter 80 is set to "0" and the selector 79 supplies the charging electrode 16 with a "0" phase search signal through a mixer 82 and an amplifier 83. When the detecting electrode 17 does not feed any output to an amplifier 84 within, say, 3 ms after the supply of the search signal to the charging electrode 16, a counter 86 counts up until the amplifier 84 receives an output from the detecting electrode 17. Then a drive signal of the phase corresponding to the count of the counter 86 is fed to the vibrator 13. As output of the detecting electrode 17 appears at the amplifier 84, the counter 86 is deactivated and holds the count. Let it now be assumed that the output of the detecting electrode 17 at the amplifier 84 appeared when the phase of the drive signal A was "3". Then since the charging phase at this instant is "O" as already stated, there holds the following relation between the charging phase and driving phase.

| | | | | | | | | | |
|---|---|---|---|---|---|---|---|---|---|
| Charging Phase: | 0 | 1 | 2 | 3 | 4 | 5 | 6 | 7 | 8 |
| | ‖ | ‖ | ‖ | ‖ | ‖ | ‖ | ‖ | ‖ | ‖ |

-continued

| | | | | | | | | | |
|---|---|---|---|---|---|---|---|---|---|
| Driving Phase: | 3 | 4 | 5 | 6 | 7 | 8 | 0 | 1 | 2 |

After the phase search, the system is set to the printing mode. An 8-bit counter 87 starts counting and stops counting when a flip-flop 88 is set by the prescan signal which indicates one rotation of the drum 22. A comparator 90 compares the counts of the counters 80 and 87 and, if the counts are not equal, the counters 80 and 86 are caused to count up. Supposing that the count of the 8-bit counter 87 is "4", the comparator 90 produces a coincidence output when the count of the counter 87 changes from "0" to "4" whereupon the counters 80 and 86 are deactivated. The charging phase is thus "4" and the driving phase is "7". This allows a drive signal of drive phase "7" to reach the vibrator 13 so that the separation time of the ink column into droplets becomes synchronous with the charging phase "4".

The charging pulse generator 89 generates the charging pulse D whose center is the charge phase "4" and feeds them to a charging signal generator 91. The generator 91 in turn forms the charging signal F from the print data signal E and charging pulse signal D. If the print data signal E is present, the circuit 91 passes the charging signal F to the charging electrode 16 via the mixer 82 and amplifier 83. Ink droplets charged by the charging electrode 16 are deflected by the deflecting electrodes 18 and 19 for printing data. A counter 92 on the other hand counts the charging pulses and, after reaching a given count, feeds an output to a coincidence circuit 93 to reset the flip-flop 88. This is the end of one scan line of data printing operation. Resetting of the flip-flop 88 activates the 8-bit counter 87 and causes it to repeatedly count until the prescan signal appears. When this signal appears to reset the flip-flop 88, the 8-bit counter 87 stops counting. The separation time of an ink jet into droplets is again controlled to the phase at which the prescan signal appeared and data of the next line is printed.

While charged ink droplets have been employed in this embodiment to print out data on a recording sheet, they may be collected in the gutter 21 and printing performed by non-charged droplets which fly straight to the sheet 32. The separation timing of the ink droplets may be varied by controlling the amplitude of the drive signal instead of the phase. Furthermore, it will be apparent that the phase of the drive signal may be divided by any desired number other than eight which has been employed for illustration.

In summary, the present invention can synchronize the separation time of an ink jet into droplets using a signal indicating a predetermined relative position of a recording sheet such as a prescan signal. In the illustrated case, the system of the invention succeeds in reducing dislocation of dots down to $\frac{1}{8}$ without resort to an increase in the frequency of the drive signal.

Various other modifications will become possible for those skilled in the art after receiving the teachings of the present disclosure without departing from the scope thereof.

What is claimed is:

1. An ink jet printing apparatus including an ink ejection head, drive signal generator means for applying an alternating electric drive signal to the ejection head causing the ejection head to eject a jet of ink which separates into droplets at a predetermined position, charging electrode means disposed at the predetermined position, charging signal generator means for applying an alternating electric charging signal to the charging electrode means for charging the droplets, charge detector means disposed downstream of the charging electrode means for detecting a charged condition of the ink droplets and scan means for producing relative scanning movement between the ejection head and a sheet, characterized by comprising:

position detector means for detecting a prescan position of the ejection head relative to the sheet; and control means for initially causing the drive signal generator means and the charging signal generator means to sweepingly vary phases of the drive signal and charging signal between predetermined respective limit values, lock the phase of the charging signal at a present value when the position detector means detects the prescan position and subsequently lock the phase of the drive signal when the charge detector means detects the charged condition of the droplets.

2. An apparatus as in claim 1, in which the scan means causes the sheet to rotate relative to the ejection head.

3. An apparatus as in claim 1, in which the charge detector means comprises an electrode.

4. An apparatus as in claim 1, further comprising deflecting electrode means for deflecting charged ink droplets onto the sheet and print control means for inhibiting the charging electrode means and thereby preventing droplets from being charged where it is desired not to print, uncharged droplets being undeflected by the deflecting electrodes and hitting a gutter.

* * * * *